United States Patent Office 3,841,971
Patented Oct. 15, 1974

3,841,971
SYNERGISTIC ENZYMES ADSORBED WITHIN POROUS INORGANIC CARRIERS
Ralph A. Messing, Horseheads, N.Y., assignor to Corning Glass Works, Corning, N.Y.
No Drawing. Filed Feb. 16, 1973, Ser. No. 332,804
Int. Cl. C07g 7/02
U.S. Cl. 195—63                                        4 Claims

ABSTRACT OF THE DISCLOSURE

Immobilized enzyme composite comprising two or more different types of enzymes adsorbed within the pores of an inorganic carrier having an average pore diameter at least as large as the largest dimension of the larger or largest enzyme so adsorbed but less than 1000 A.

RELATED APPLICATION

U.S. Patent Application Ser. No. 332,807, filed of even date herewith in the name of R. A. Messing and entitled "Enzymes Immobilized on Porous Inorganic Support Materials."

BACKGROUND OF THE INVENTION

Field

This invention relates generally to immobilized enzyme composites comprising multiple enzymes adsorbed to high surface area, porous inorganic carrier materials. More specifically, the invention is concerned with the immobilization of at least two different enzymes within the pores of a porous inorganic carrier having an average pore diameter related to the sizes of the adsorbed enzymes. As used herein, the terms "immobile," "immobilized," and "immobilization," when applied to enzymes, refer to enzymes which have been rendered essentially insoluble by adsorbing the enzymes to porous, essentially-insoluble, inorganic carriers in such a manner that the adsorbed enzymes demonstrate a prolonged retention of their catalytic activity.

Prior Art

It has been disclosed recently that re-useable immobilized enzyme composites can be prepared by adsorbing or chemically coupling enzymes to various inorganic carrier materials. U.S. Pat. No. 3,556,945 discloses methods of adsorbing enzymes to siliceous carriers such as porous glass particles. U.S. Pat. No. 3,519,538 discloses methods of chemically coupling enzymes to various inorganic materials via intermediate silane coupling agents. As pointed out in the above patents, various advantages have been found in using inorganic support materials instead of organic support materials as carriers for enzymes. Those advantages (i.e. non-swellability, rigidity, resistance to microbial attack, sterilizability, and others) are incorporated herein by reference. Although the above-described composites can be used repeatedly without significant loss in activity of the attached enzymes, the composites are highly specific in the types of reactions they promote. Thus, even though specificity of reaction is often a highly desirable feature of known enzyme composites, those composites have utility in promoting only one type of reaction. I have now found that immobilized enzyme composites having multiple enzyme types can be prepared in such a way that the resulting composites promote two or more simultaneous reactions having a synergistic effect.

SUMMARY OF THE INVENTION

The immobilized enzyme composits comprise at least two different types of enzymes adsorbed within the pores of a high surface area, porous, inorganic carriers having an average pore diameter at least as large as the largest dimension of the larger or largest enzyme adsorbed but less than about 1000 A. The multiple enzyme systems are chosen for a given porous inorganic carrier so that in use the adsorbed enzymes will act synergistically. Essential to the synergistic output of the immobilized enzyme systems in the porous inorganic carrier. The average pore size of the carrier is critical to the successful immobilization and use of multiple enzymes. The criticality is dramatically demonstrated with an immobilized enzyme composite comprising the enzymes glucose oxidase and catalase adsorbed within the pores of porous inorganic carriers having average pore sizes within the range of about 220 A. to 985 A. When the above multiple enzyme system is immobilized within an inorganic carrier having a carefully selected average pore size, the resulting composite is extremely stable and can be used in many applications where soluble glucose oxidase is presently being used or, with appropriate instrumentation, for the clinical sensing of glucose concentrations.

SPECIFIC EMBODIMENTS

A very critical feature of the invention is the porous inorganic material used as a carrier for the adsorbed enzymes. The carrier must be porous and should have a high surface area to maximize the surface area available (mostly internal) for the loading of the enzymes. Generally, the surface area should be at least 5 m.$^2$/g. and preferably greater than about 25 m.$^2$/g. The materials which can be used as carriers include any essentially water-insoluble porous inorganic material having available surface oxide or hydroxyl groups necessary for the surface bonding of the enzymes through adsorptive forces similar in principle to those described in U.S. Pat. No. 3,556,945. Typical carriers include porous glass particles or beads, dried silica gels, porous alumina, titania, or zirconia bodies, or mixtures thereof, and like materials. The porous inorganic carriers need only have surface hydroxyl or oxide groups available for use in bonding the enzymes to the surface through groups on the enzymes which are not essential for enzyme activities. Preferably the porous carriers are non-siliceous for better alkaline durability and ceramic rather than porous glass because of the undesirably higher costs associated with preparing porous glass bodies. As a very practical matter, the inorganic carriers should have a mesh size between about 4 and 200 mesh, United States Standard Sieve. Particle sizes greater than 4 mesh require an undue amount of time for enzyme diffusion prior to enzyme bonding and also present substrate diffusion problems. Particle sizes smaller than about 200 mesh are difficult to handle and when used as enzyme carriers in column result in an undesirably tight packing and cause undesirably high pressure drops through the column. I have found that a preferred mesh size for the carrier particles is between about 25 and 80 mesh, U.S. Standard Sieve.

The average pore size of the carriers must be at least equal to the largest dimension of the larger or largest of the enzymes to be immobilized to assure a composite containing all enzymes of a multiple enzyme system. This minimum average pore size is required to permit entry into the pores and mass diffusion of the enzyme through the pores of the carrier so that the largely internal surface area of the carrier can be fully utilized for adsorption of the larger or largest enzyme and the smaller enzymes.

The average pore size of the carrier should not exceed about 1000 A. for two reasons. Firstly, as the average pore size of the carrier exceeds about 1000 A., there occurs a significant reduction in the surface area available for loading the enzyme. Secondly, and very importantly, as the average pore size exceeds about 1000 A., the enzyme adsorbed within such pores becomes more subject to the stresses of any surrounding turbulent environments which, in general, tend to detach these less protected enzymes. To a limited extent, described below, the sizes of the substrates to be acted upon by the immobilized enzymes help determine an ideal avearge pore diameter for carriers of a given multiple enzyme system. As a very practical matter many multiple enzymes can be advantageously adsorbed within carriers having an average pore diameter between 100 A and 1000 A.

To demonstrate a synergistic effect two or more different types of enzymes need only be successfully adsorbed, preferably simultaneously, within the pores of the same carrier since, by virtue of being used in combination, the multiple enzymes reduce the number of processing steps required for a given series of enzymatic reactions in direct proportion to the number of different types of enzymes immobilized. Further, both substrate and product diffusion times are considerably reduced. Thus, where two different enzymes are adsorbed within the pores of the same carrier, only one step is needed to quickly promote the catalases of two separate reactions since only one type of composite need be added or removed from a reaction medium. Likewise, when three enzymes are immobilized, three catalases can be promoted with one composite.

It should be noted, however, that the synergistic effect of two or more enzymes adsorbed within the pores of the same carrier may be even more dramatically demonstrated with combinations of certain mixed enzyme systems. For example, it is known that the enzyme glucose oxidase catalyzes the oxidation of glucose to gluconic acid and hydrogen peroxide. For this reaction, oxygen is needed and it must be continuously available. However, as catalysis proceeds, and the by-product hydrogen peroxide is produced, it, in turn, tends to oxidize the glucose oxidase, thus destroying enzyme activity by oxidizing the enzyme. If, however, an enzyme such as catalase is adsorbed within the same porous carrier as the glucose oxidase, the activity of the glucose oxidase is not only maintained, but enhanced. This is because catalase acts on a hydrogen peroxide substrate, thereby removing it from solution, to yield free oxygen needed by the glucose oxidase. Thus, as the glucose oxidase system depletes available free oxygen from a solution to yield a hydrogen peroxide product, the removed oxygen is continuously replenished by the catalase which releases free oxygen by acting on and removing the available but undesirable hydrogen peroxide. Further, since the various reactions occur deeply within the pores, substrate diffusion times for the oxygen and hydrogen peroxide are reduced considerably.

Examples of other synergistic enzyme systems effective in a similar manner are galactose oxidase and catalase and a mixed system consisting of D-amino acid oxidase and catalase. Examples of synergistic enzymes operating in a different manner are mixed systems consisting of the proteolytic enzymes chymotrypsin and trypsin or papain and *Streptococcus* peptidase A. Inasmuch as the above enzymes promote protein hydrolysis by breaking different bond sites in proteins, in combination the enzyme pairs can be used in a single step to yield polypeptide units which are smaller than those which could be obtained with each enzyme acting separately and alone. Further, substrate diffusion times are reduced considerably with multiple enzymes within the same pores of a carrier.

The criticality of using a carrier having an average pore size at least as large as the largest dimension of the larger or largest enzyme is illustrative in the examples below. In the examples, multiple enzyme systems comprising glucose oxidase (molecular weight about 150,000 and largest dimension of about 84 A.) and catalase (molecular weight about 250,000 and largest dimension of about 183 A.) were adsorbed to porous alumina and porous titania carriers having a closely controlled average pore size ranging from a low average pore diameter of about 175 A. to a high average pore diameter of 855 A. The carriers comprised samples of porous alumina having an average pore diameter of about 175 A. and samples of porous titania bodies having average pore diameters of 350 A., 420 A., 820 A., and 855 A. The minimum and maximum pore sizes the titania bodies were 220 A. and 985 A., respectively. The physical properties of the carriers used in the examples are summarized in Table I below and the carriers hereafter are specifically referred to in terms of their average pore diameter.

TABLE I
Porous carriers

|  | $Al_2O_3$ | $TiO_2$ | $TiO_2$ | $TiO_2$ | $TiO_2$ |
|---|---|---|---|---|---|
| Average pore diameter (A.) | 175 | 350 | 420 | 820 | 855 |
| Minimum pore diameter (A.) | 140 | 220 | 300 | 760 | 725 |
| Maximum pore diameter (A.) | 220 | 400 | 590 | 875 | 985 |
| Pore volume (cc./g.) | 0.6 | 0.45 | 0.4 | 0.2 | 0.22 |
| Surface area (m.$^2$/g.) | 100 | 48 | 35 | 7 | 9 |
| Particle mesh size | 25–60 | 25–60 | 30–80 | 25–80 | 25–80 |

The immobilized enzyme composites using each of the above described carriers (300 mg. carrier samples) were made using standardized preparations of glucose oxidase and catalase as available from Miles Laboratories. The enzymes were separated from fermentations of *Aspergillus niger*. The enzyme preparation was a liquid system containing the mixed enzymes. The liquid preparation consists of the two enzymes stabilized in glycerol and standardized to contain 750 glucose oxidase units and 225 catalase units per ml. The definition of the glucose oxidase unit used herein is based on the manometric assay procedure published by D. Scott in *J. Agr. Food Chem.*, Vol. 1, p. 727 (1953). The glucose oxidase unit (GOU) is defined as the quantity of enzyme which will cause the uptake of 10 mm.$^3$ of oxygen per minute in the Warburg Manometer at 30° C. in the presence of excess oxygen with a substrate containing 3.3% glucose monohydrate and phosphate buffer at pH 5.9.

The glucose substrate solution used in determining the glucose oxidase activity of the multiple enzyme composites was prepared as follows: Sixty grams of anhydrous dextrose were transferred to one liter volumetric flask and distilled water was added to just below the one liter mark. Then 0.15 ml. of 30% $H_2O_3$ was added to the flask and the level of the contents were brought to the one liter mark with distilled water. The solution was then permitted to stand at room temperature for at least two hours after dissolution of the dextrose to permit mutarotation of the sugar before use.

PREPARATION OF THE MULTIPLE ENZYME COMPOSITES

The Enzymes

A 20 ml. volume of the above-described glucose oxidase-catalase preparation was dialyzed against four charges of 3500 ml. distilled water in a 4 liter beaker over a two-hour period with stirring at room temperature. The final volume of the dialyzed enzyme solution was 50 ml. This solution was centrifuged at 2200 r.p.m. for 15 minutes at room temperature. The insoluble particles were discarded. The estimated activity of the solution was about 300 GOU per ml.

The Carriers

Three hundred milligram quantities of each of the above-described carrier samples were transferred to separate 10 ml. cylinders. To each cylinder, 9.0 ml. of 0.5 M sodium bicarbonate was added to precondition the carrier surfaces. The cylinders were then placed in a shaking water bath at 35° C. where they were shaken for three hours. The cylinders were removed from the bath, the bicarbonate solutions decanted, and 9 ml. distilled water was added to each cylinder. The cylinders were stoppered and inverted several times and the water washes were decanted. At this point each 300 mg. sample of the porous bodies was ready for the adsorption and immobilization of the enzymes.

The Composites

The mixtures of glucose oxidase and catalase were adsorbed on the inner surfaces of 300 mg. of each of the above described carriers as follows: An 8 ml. volume of the dialyzed glucose oxidase-catalase solutions (containing approximately 2400 glucose oxidase units) was added to each cylinder containing the 300 mg. carrier samples. Each cylinder was then partially immersed in a shaking water bath at 35° C. and shaken at that temperature for about 2 hours and 20 minutes. The simultaneous diffusion and adsorption of the enzymes was then allowed to continue overnight (about 15 hours) at room temperature without shaking. The enzyme solutions were then decanted and 9 ml. of distilled water was added to each cylinder. The cylinders were then stoppered and inverted several times and the water washes were decanted and discarded. Each of the multiple enzyme composites was then washed with 9 ml. of 0.5M sodium chloride. The washes were decanted and the immobilized enzyme composites were each exposed to 9 ml. of 0.2M acetate buffer, pH 6.1 as a further wash. The acetate buffer solutions were then decanted and the composites were exposed to a final wash with 9.0 ml. of distilled water.

Periodic Assays

Each composite was transferred to separate glass columns having an inner diameter of about 7 mm. and 2 mm. bore Teflon® stopcocks with Fiberglas® retainers just above the stopcock fittings. The composites were stored in the columns with water covering the composites and the top openings of the columns corked with cork stoppers. The composites were so stored at room temperature between assays. The immobilized enzyme composites were periodically assayed for glucose oxidase activity in a manner similar to that described for the free enzyme with the exception that 100 ml. of the glucose substrate solution was employed for the assay reaction rather than the 25 ml. volume used for the free enzyme assay. In the first two examples, the substrate was flowed through the columns at a flow rate of 145 ml./hour. In Examples IV–VI, the flow rate of substrate solution through the columns was at 390 ml./hour. The glucose oxidase activity of the composites was determined at any one point by measuring the amount of gluconic acid produced by the known amounts of multiple enzyme composites under assay conditions and expressing the results in glucose oxidase units (GOU) per gram of carrier by known means.

EXAMPLES I AND II

The first two examples illustrate the criticality of having the average carrier pore diameter be at least as large as the largest dimension of the larger enzyme (catalase, which has a largest dimension of about 183 A). The column of Example I contained the composites consisting of both enzymes adsorbed to 300 mg. of the alumina carrier having an average pore diameter of 175 A. The column of Example II contained the composites consisting of both enzymes adsorbed to 300 mg. of the titania carrier having an average pore diameter of 350 A. Into each of the above columns a 100 ml. volume of the glucose containing substrate solution was periodically introduced by circulation at intervals over a 38 day period. The stopcocks of the columns were adjusted to maintain a substrate solution head of about ¾ inch above the top surfaces of the composites during the assay periods. A flask containing 100 ml. of substrate solution had an outlet tube feeding through a peristaltic pump into the top of the column and the outlet of the column fed back into the flask. Circulation of the substrate solution was at a flow rate of about 145 ml. per hour. The temperature for all assays in these two examples was 22° C. except for the last (assay day 38) at which time the room and assay temperature was 19° C. The periodic assay results for both composites are shown in Table II for the first 38 days. The composite using the 350 A. porous titania carrier (Example II) was subjected to further periodic assays and, after 165 days, the composite, quite surprisingly, was found to have retained 82% of its original glucose oxidase activity.

TABLE II

Comparison of glucose oxidase activities per gram of porous $Al_2O_3$ and porous $TiO_2$

| | Carrier | |
|---|---|---|
| | Example I | Example II |
| Assay day | Porous (175 A.) $Al_2O_3$ | Porous (350 A.) $TiO_2$ |
| 1 | 12.9 | 20.5 |
| 1 | 18.7 | 36.2 |
| 4 | 11.7 | 36.2 |
| 5 | 10.1 | 36.2 |
| 6 | 8.5 | 36.2 |
| 7 | 7.0 | 36.2 |
| 38 | (¹) | 32.5 |
| 59 | | 36.2 |
| 83 | | 35.9 |
| 103 | | 35.5 |
| 136 | | 32.5 |
| 165 | | 29.6 |

¹ Results too low to measure.

The results in Table II show that activity losses of the composites using the 350 A. porous titania were essentially negligible over the first 38 days of storage. The composites using the smaller average pore size (175 A.) alumina exhibited a continuous loss of activity over the same time span. At no time did the porous alumina composite exhibit a higher activity than the composite using titania as a carrier, thus indicating that the internal pore volume of the alumina was not utilized as well as the internal pore volume of the porous titania carrier. In examining the physical characteristics of the porous carriers, it can be seen that the alumina has a higher surface area than the 350 A. titania and it would be expected that a higher loding of the glucose oxidase could be achieved with the alumina bodies. As can be seen from the results, however, this was not the case. It appears that only the larger pores of the alumina bodies were used for immobilization of the catalase, whereas substantially all of the pores of the titania carrier are used since the minimum pore size of the titania carrier is about the same as the maximum pore size of the alumina carrier (e.g. 220 A.). Since it is known that the average pore diameter of the porous alumina was only 175 A., and that the largest dimension of the catalase cell unit is about 183 A., it can be concluded that the catalase was selectively immobilized only in the largest pores of the alumina. Such small quantities of catalase which are immobilized at the mouths of the larger pores or on the outer surfaces of alumina can be readily lost due to the turbulent outer environment of the substrate solution passing through the column. This accounts for the steady loss in activity noted in the use of the carrier having an average pore diameter of 175 A. Accordingly, to assure that both glucose oxidase and catalase are not only able to penetrate and diffuse through the pores of an inorganic carrier but also adsorbed deeply into the carrier to be protected from detachment, the average pore size of the carrier must be at least as large as the largest dimension of the larger or largest enzyme, in this case the catalase. It should be pointed out that enzymes are commonly elongate molecules. Thus, by assuring an average carrier pore size larger than the largest dimension of the enzyme, diffusion of the enzyme throughout the pores is assured even with normal molecular spin of the enzyme in solution.

EXAMPLES III–VI

A second series of experiments was performed to demonstrate the effect of increasing average pore size on the glucose oxidase activity retention and composite stability. A second 300 mg. sample of the porous titania bodies (average pore size of 350 A.) was preconditioned as in Example II and these bodies were used as carriers for composites to be compared with similarly prepared composites having average carrier pore diameters of 420 A., 820 A., and 855 A., respectively. All four composites were prepared as described above and assayed in columns as in Examples I and II with the flow rates of substrate solution set at 390 ml./hour. At this higher flow rate, an increase in the apparent activity would be expected since diffusion of the substrate is enhanced. The composite stabilities under similar assay conditions are shown for a 42 day period in Table II wherein the glucose oxidase activity is expressed in terms of glucose oxidase units per gram of carrier (GOU/g.).

TABLE III

Comparison of glucose oxidase activities per gram of $TiO_2$ carriers of increasing average pore diameters

| Assay day | $TiO_2$ carrier average pore size (A.) | | | |
|---|---|---|---|---|
| | 350 A. | 420 A. | 820 A. | 855 A. |
| 0 | 66.0 | 56.4 | 43.9 | 37.8 |
| 3 | 66.0 | 77.7 | 43.9 | 39.7 |
| 8 | 66.0 | 84.5 | 46.2 | 40.3 |
| 13 | 66.0 | 84.5 | 46.2 | 44.3 |
| 42 | 66.0 | 80.5 | 40.3 | 42.0 |

As can be seen from the table, in all four composites the long term activity of the glucose oxidase (GOU/g.) is remarkably stable. This is particularly true in the composites using the porous titania having an average pore size of 350 A. since no activity loss was detected over a 42 day period under assay conditions in which there was an increased flow rate (390 ml./hour v. 145 ml./hour) of substrate solution, because of which one would expect increased enzyme detachment. As the average pore diameter of the carrier increased, beyond 420 A., there was found a decrease in enzyme loading and this is attributable to the decreased surface area (7–9 m.²/g.) found in the porous $TiO_2$ carriers having average pore sizes of 820 A. and 855 A. The composites using the porous titania having an average pore diameter of 420 A. showed the highest loading in terms of GOU/g. and for this reason a porous inorganic carrier having similar properties (minimum pore diameter of 300 A. and maximum pore diameter of 590 A., etc.) is preferred for a synergistic glucose oxidase-catalase system. Even the composite having a carrier of an average pore size of 855 A. (with a minimum pore diameter of 725 A. and a maximum pore diameter of 985 A.) was remarkably stable although the number of GOU's/g. is reduced because of less surface area for adsorption. It is thought that, given the teachings of this disclosure, the ideal average pore size and composition of a given carrier vis-a-vis a given multiple enzyme system can be readily determined through simple experimentation by one skilled in the art of preparing immobilized enzymes. For example, if the resulting composite were to be used in an alkaline environment, siliceous carriers would be avoided because of their known low durability at an alkaline pH. Further, the preferred average carrier pore size range can be determined for a given multiple enzyme system in a manner similar to that used in Examples III–VI. Once the largest dimension of the larger or largest enzyme is known, the preferred average pore size range can be readily determined by knowing that the average pore size range must be at least as large as the larger or largest enzyme but less than 1000 A. The preferred carrier pore size can be readily determined by starting with carriers having an average pore size at the lower end of the range or an average pore diameter slightly larger than the largest dimension of the larger or largest enzyme. Preferably, the higher end of the range (about 1000 A.) is initially avoided because of the expected lower surface area and consequent lower enzyme loading, except in cases where unusually large substrates are anticipated.

It will be apparent to those skilled in the art that many variations and modifications of the above-described invention may be made without departing from the spirit and scope thereof. Accordingly, it is intended that the above examples should be construed as illustrative and that the scope of the invention should be limited only by the appended claims.

I claim:

1. An immobilized enzyme composite comprising two synergistic enzymes adsorbed to the internal surface of a high surface area, porous titania body, the porous titania body having an average pore diameter at least as large as the largest dimension of the larger enzyme but less than 1000 A., and the two synergistic enzymes selected from the group consisting of glucose oxidase and catalase, galactose oxidase and catalase, D-amino acid oxidase and catalase, chymotrypsin and trypsin, and papain and *Streptococcus* peptidase A.

2. The composite of claim 1 wherein the synergistic enzymes are glucose oxidase and catalase and the porous titania body has an average pore diameter between about 220 A. and 985 A.

3. The composite of claim 2 wherein the porous titania body has an average pore diameter between about 300 A. and 590 A.

4. The composite of claim 3 wherein the porous titania body is a particle having a particle size between about 25 and 80 mesh, U.S. Standard Sieve.

References Cited

UNITED STATES PATENTS

| | | | |
|---|---|---|---|
| 3,666,627 | 5/1972 | Messing | 195—68 |
| 3,705,084 | 12/1972 | Reynolds | 195—63 |
| 3,556,945 | 1/1971 | Messing | 195—63 |
| 3,519,538 | 7/1970 | Messing et al. | 195—63 |
| 3,282,702 | 11/1966 | Schreiner | 195—63 X |
| 2,968,635 | 1/1961 | Nixon | 252—466 |
| 3,783,101 | 1/1974 | Tomb et al. | 195—63 |

OTHER REFERENCES

Hawley, G. G., The Condensed Chemical Dictionary, 8th ed., Van Nostrand Reinhold Co., N.Y., 1971 (pp. 37, 874, 875 and 956).

DAVID M. NAFF, Primary Examiner

U.S. Cl. X.R.

195—68, DIG 11